(12) United States Patent
Acar et al.

(10) Patent No.: US 7,272,251 B2
(45) Date of Patent: Sep. 18, 2007

(54) METHOD FOR DETECTING AND CLASSIFYING A STRUCTURE OF INTEREST IN MEDICAL IMAGES

(75) Inventors: Burak Acar, Bebek (TR); Christopher F. Beaulieu, Los Altos, CA (US); Salih B. Gokturk, Mountain View, CA (US); Carlo Tomasi, Palo Alto, CA (US); David S. Paik, Palo Alto, CA (US); R. Brooke Jeffrey, Jr., Los Altos Hills, CA (US); Sandy A. Napel, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 838 days.

(21) Appl. No.: 10/676,721

(22) Filed: Sep. 30, 2003

(65) Prior Publication Data
US 2004/0141638 A1 Jul. 22, 2004

Related U.S. Application Data

(60) Provisional application No. 60/415,280, filed on Sep. 30, 2002.

(51) Int. Cl.
*G06K 9/00* (2006.01)
(52) U.S. Cl. .................. 382/128; 382/154
(58) Field of Classification Search .......... 382/242, 382/103, 154, 128; 345/420, 424, 425, 441, 345/442, 443
See application file for complete search history.

(56) References Cited
U.S. PATENT DOCUMENTS

| | | | |
|---|---|---|---|
| 5,458,111 A | 10/1995 | Coin et al. | |
| 5,491,627 A | 2/1996 | Zhang et al. | |
| 5,891,030 A | 4/1999 | Johnson et al. | |
| 5,920,319 A | 7/1999 | Vining et al. | |
| 5,971,767 A | 10/1999 | Kaufman et al. | |
| 6,083,162 A | 7/2000 | Vining | |
| 6,246,784 B1 | 6/2001 | Summers et al. | |
| 6,301,378 B1 | 10/2001 | Karssemije et al. | |
| 6,331,116 B1 | 12/2001 | Kaufman et al. | |
| 6,345,112 B1 | 2/2002 | Summers et al. | |

(Continued)

OTHER PUBLICATIONS

"three-dimensional computer-aided diagnosis scheme for detection fo colonice polyps", IEEE transactions on medical imagin, vol. 20, No. 12, Dec. 2001.*

(Continued)

*Primary Examiner*—Joseph Mancuso
*Assistant Examiner*—Claire X Wang
(74) *Attorney, Agent, or Firm*—Lumen Intellectual Property Services, Inc.

(57) ABSTRACT

A method to detect and classify a structure of interest in a medical image is provided to enable high specificity without sacrificing the sensitivity of detection. The method is based on representing changes in three-dimensional image data with a vector field, characterizing the topology of this vector field and using the characterized topology of the vector field for classification of a structure of interest. The method could be used as a stand-alone method or as a post-processing method to enhance and classify outputs of a high-sensitivity low-specificity method to eliminate false positives.

12 Claims, 3 Drawing Sheets

U.S. PATENT DOCUMENTS

| | | | |
|---|---|---|---|
| 6,556,696 B1* | 4/2003 | Summers et al. | ............ 382/128 |
| 2002/0039400 A1 | 4/2002 | Kaufman et al. | |
| 2002/0045153 A1* | 4/2002 | Kaufman et al. | ............ 434/262 |
| 2002/0097320 A1 | 7/2002 | Zalis | |

OTHER PUBLICATIONS

"Description of shapes in CT images", Jan./Feb. 1999, IEEE engineering in medicine and biology.*

D.S. Paik et al., "Detection of polyps in CT colonography: A comparison of a computer aided detection algorithm to 3-D visualization methods," in Proc. 85th Scientific Sessions Radiological Society of North America, vol. 213 (P). Chicago, IL, 1999, p. 428.

Paik et al., "Computer-aided detection of polyps in CT colonography: Free response ROC evaluation of performance," Radiology, vol. 217 (SS), p. 370, 2000.

R.M. Summers et al., : Automated polyp detection at CT colonography: Feasibility assessment in a human population, Radiology, vol. 219, No. 1, pp. 51-59, 2001.

R.M. Summers et al., "Automated polyp detector for Ct colonography: Feasibility study," Radiology, vol. 216, No. 1, pp. 284-290, 2000.

A. H. Mir et al., "Description of shapes in CT images: The usefulness of time-series modeling techniques for identifying organs," IEEE Eng. Med. Bio. Mag., vol. 18, pp. 79-84, Jan./Feb. 1999.

PC Mahalanobis, On the generalized distance in statistics, Proc. Natl. Institute of Science of India 12:49-55, 1936.

Lavin et al., "Feature Comparisons of Vector Fields Using Earth Mover's Distance", in Proc. Visalization, 1998, pp. 103-110.

Helman et al., "Representation and Display of Vector Field Topology in Fluid Flow Data Sets", IEEE, Aug. 1989, pp. 27-36.

S.S. Beauchemin et al., "The Computation of Optical Flow", ACM Computing Surveys, vol. 27, No. 3, Sep. 1995, pp. 433-467.

S.B. Gokturk et al., "A Graph method for the conservative detection of polyps in the colon," in *Proc. 2nd Int. Symp. Virtual Colonoscopy*, Boston, MA, 2000.

H, Yoshida et al., "Detection of colonic polyps in CT colonography based on geometric features," Radiology, vol. 217 (SS), p. 582-2000.

H. Yoshida et al., "Three-dimensional computer-aided diagnosis scheme for detection of colonic polyps," IEEE Trans. Med. Imag., vol. 20, pp. 1261-1274, Dec. 2001.

\* cited by examiner

METHOD FOR DETECTING AND CLASSIFYING A STRUCTURE OF INTEREST IN MEDICAL IMAGES

CROSS-REFERENCE TO RELATED APPLICATIONS

This application is cross-referenced to and claims priority from U.S. Provisional Application 60/415,280 filed Sep. 30, 2002, which is hereby incorporated by reference.

STATEMENT REGARDING FEDERALLY SPONSORED RESEARCH OR DEVELOPMENT

The present invention was supported in part by grant number RO1 CA72023 from the National Institutes of Health (NIH/NCI). The U.S. Government has certain rights in the invention.

FIELD OF THE INVENTION

The present invention relates generally to medical imaging. More particularly, the present invention relates to methods for detecting and classifying a structure of interest in medical images to differentiate for instance (pre-)cancerous tissue from normal tissue.

BACKGROUND

Computed tomographic colonography (CTC) was first suggested in the early 1980s as a potential method for mass screening of colorectal cancer, the second leading cause of cancer deaths in the US. CTC was first realized in the 1990s following the rapid progress in computed tomography (CT) and in digital computing. CTC is a minimally invasive method that involves the steps of CT imaging the whole abdomen and pelvis after cleansing and air insufflation of the colon. Since the first realization, several studies have been conducted assessing the performance of CTC, mostly based on a radiologist's visual examination of either two-dimensional (2-D) CT images or three-dimensional (3-D) virtual colonoscopic views, or both. Most efforts have been directed toward developing better visualization and navigation techniques, such as rendering, colon wall flattening, flight path planning algorithms, and user interface design. Recently some research has focused on developing computer-aided detection (CAD) methods for the identification of colonic polyps in 3-D CT data to improve the accuracy and efficiency of CTC. In these identification approaches, the 3-D geometrical features of polyps are extracted and used for their detection and identification. Mir et al. reviewed a set of methods proposed for shape description in CT images, e.g., moments, medial axis transforms, splines, curvature, Fourier descriptors, AR (Auto-Regressive) modeling, and statistical approaches (See A. H. Mir et al., "Description of shapes in CT images: The usefulness of time-series modeling techniques for identifying organs," *IEEE Eng. Med. Biol. Mag.*, vol. 18, pp. 79-84, January/February 1999). Summers et al. concluded that detection by shape analysis is feasible, especially for clinically important large polyps (See e.g. R. M. Summers et al., "Automated polyp detector for CT colonography: Feasibility study," *Radiology*, vol. 216, no. 1, pp. 284-290, 2000; R. M. Summers et al., "Automated polyp detection at CT colonography: Feasibility assessment in a human population," *Radiology*, vol. 219, no. 1, pp. 51-59, 2001). Paik et al. proposed to use a method based on overlapping surface normals to detect spherical surface patches along the colon wall that are likely to be parts of polyps (See e.g. D. S. Paik et al., "Computer-aided detection of polyps in CT colonography: Free response ROC evaluation of performance," *Radiology*, vol. 217(SS), p. 370, 2000; D. S. Paik et al., "Detection of polyps in CT colonography: A comparison of a computer aided detection algorithm to 3-D visualization methods," in *Proc. 85th Scientific Sessions Radiological Society of North America*, vol. 213 (P). Chicago, Ill., 1999, p. 428). Yoshida et al. reported that geometric features extracted from small volumes of interest are effective in differentiating polyps from folds and feces (See H. Yoshida et al., "Detection of colonic polyps in CT colonography based on geometric features," *Radiology*, vol. 217(SS), p. 582, 2000), as well as characterizing colon wall surface geometry (See H. Yoshida et al., "Three-dimensional computer-aided diagnosis scheme for detection of colonic polyps," *IEEE Trans. Med. Imag.*, vol. 20, pp. 1261-1274, December, 2001). Göktürk et al. fitted local spheres to the colon wall and based their detection on the existence of clusters of sphere centers (See S. B. Göktürk et al., "A graph method for the conservative detection of polyps in the colon," in *Proc. 2nd Int. Symp. Virtual Colonoscopy*, Boston, Mass., 2000).

Most of these prior methods are rather sensitive (i.e. ability to detect positives), but need to be more specific (i.e. ability to detect negatives) for clinical applicability. The low specificity of some of the previously reported methods is generally due to the assumption that high curvature surface patches occur only on polyps. While it is true for instance that polyps have highly curved surfaces, so do some other structures, like haustral folds and retained stool. Radiologists reading these images use additional information to classify suspicious regions. For example, haustral folds are elongated structures, as opposed to polyps, which protrude locally from the colon wall. Stool may sometimes be identified by relatively inhomogeneous image intensity compared to polyps. However, if an automatic CAD method results in a low specificity manual examination of a (large) number of images corresponding to the CAD outputs is required to ensure proper detection. Such an examination is costly, time consuming and inefficient. Accordingly, there is a need to develop a method that would be capable of increasing specificity without sacrificing sensitivity. Such a method could also be used to enhance and classify outputs of a high-sensitivity low-specificity CAD method to eliminate false positives only.

SUMMARY OF THE INVENTION

The present invention is a method capable of detecting and classifying a structure of interest with a high specificity without sacrificing the sensitivity of detection. The method could be used as a stand-alone method or as a post-processing method to enhance and classify outputs of a high-sensitivity low-specificity method to eliminate false positives. The method is based on representing changes in 2-D cross-sections of three-dimensional image data with a vector field, characterizing the topology of this vector field and using the characterized topology of the vector field for detection, identification or recognition tasks of a structure of interest. A structure of interest is a structure of interest to a radiologist such as polyps (e.g. colonic polyps), nodules (e.g. liver and lung nodules), lesions, or the like.

More specifically, the method defines one or more image planes in a subvolume of a three-dimensional medical image. For each image plane, the edge displacement fields are computed for a plurality of slices that are defined over the axis perpendicular to its corresponding image plane. In general, one could define at least one image plane or a multiple set of image planes with each scrolling axis perpendicular to its respective/corresponding plane. In one exemplary embodiment, the image planes could be at least two mutually orthogonal planes. A more specific example could be the three anatomical planes in which the scrolling axis is defined as the axis perpendicular to its respective plane, i.e. axial, sagittal, coronal. The edge displacement fields for all slices in an image field are combined to create an edge displacement field for that image plane. This combined edge displacement field is used to determine parameters. These parameters are then used to classify the structure of interest and determine whether the structure of interest is e.g. a polyp or a non-polyp. The classification could be based on the parameters from a single image plane or a combination of image planes. For instance, the three anatomical planes could be used to determine the parameters. In case three parameters are computed per image plane, one will end up with a 3×3 feature vector. The parameters could be further processed by taking for instance the average over the image planes for each parameter or by applying other functions or processes to combine the parameters and classify the structure of interest.

BRIEF DESCRIPTION OF THE FIGURES

The objectives and advantages of the present invention will be understood by reading the following detailed description in conjunction with the drawings, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The method of the present invention could be referred to as an "Edge Displacement Field Method" (EDF), a "Gradient Field Method" (GF) or an "Optical Flow Field Method" (OFF) applied to detection and classification of structures of interests in medical images (See for an overview of optical flow computation S. S. Beauchemin et al., "The computation of optical flow," *Comput. Surv.*, vol. 27, no. 3, pp. 433-467, 1995). The present method is based on representing changes in 2-D cross-sections of three-dimensional (3-D) image data (e.g. axial, coronal and sagittal gray scale CTC data) with a vector field, characterizing the topology of this vector field and using the characterized topology of the vector field for detection, identification or recognition tasks of a structure of interest. The present invention could be utilized as a post-processing method that would refine the results of a high sensitivity, low specificity pre-detection by increasing specificity without sacrificing sensitivity. The present invention is, however, not limited to its application as a post-processing method since it could also be used as an independent method without pre-identification.

The medical images of the present invention are digital or computerized images such as, for instance, but not limited to, a CT, an MRI, a digitized X-ray, or any other medical image application that could be converted or rendered to a digital image. The medical images could be 2-D images used to construct a 3-D image or a 3-D volumetric image. A structure of interest is, for instance, but not limited to, a structure that contains pre-cancerous tissue or cancerous tissue. Examples of structures of interest to a radiologist are, for instance, polyps (such as colonic polyps), nodules (such as liver and lung nodules), lesions, or the like. However, even though the present invention is described with respect to medical images, a person of average skill in the art will readily appreciate that the present invention could easily be applied in any type of application where it is necessary to characterize a structure and determine whether this structure corresponds to a structure of interest.

Figure 1:
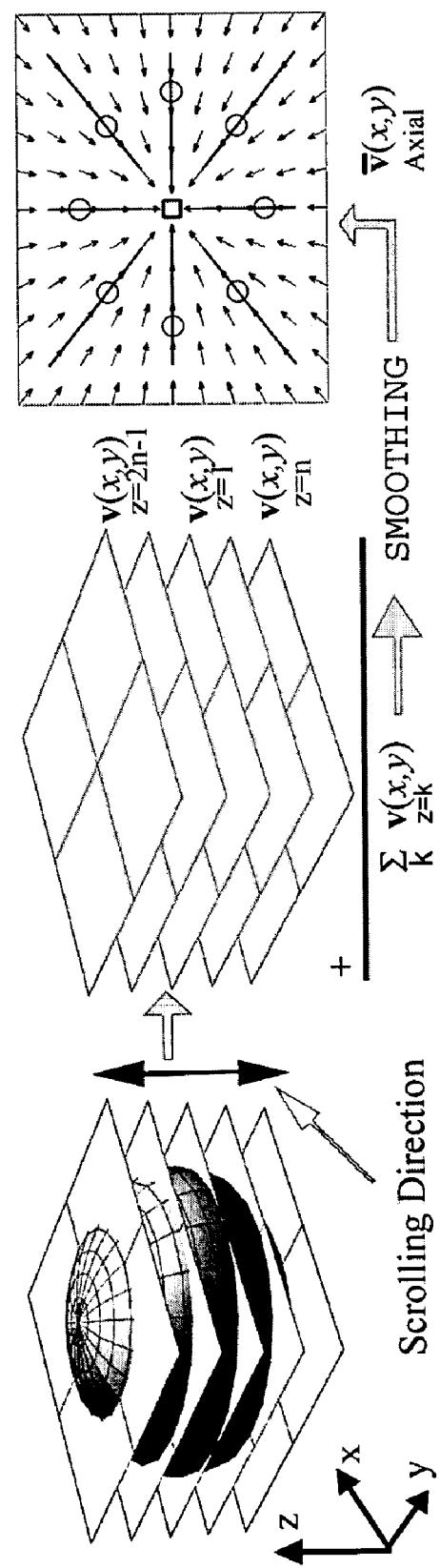
FIG. 1 shows an example of generating an axial edge displacement field demonstrated using a sphere according to the present invention.

The first step of the method is the EDF computation to represent the changes in the location of edges in the images (e.g. tissue/air boundaries) as one scrolls through the 3-D data. For instance, as shown in FIG. 1, let xy be an image plane perpendicular to the scrolling axis Z and determine the EDF. In general, one could define at least one image plane or a multiple set of image planes with each scrolling axis perpendicular to its respective/corresponding plane. In one exemplary embodiment, the image planes could be at least two mutually orthogonal planes. A more specific example could be the three anatomical planes and the scrolling axis defined as the axis perpendicular to its respective plane, i.e. axial, sagittal, coronal. This specific exemplary embodiment of three mutually orthogonal image planes is further described infra.

The EDF equation for the xy plane is:

$$\nabla I_{z=k} \cdot v_{z=k} + \frac{\partial I_{z=k}}{\partial z} = 0 \qquad (1)$$

where $v_{z=k}(x,y)$ is the EDF defined on the plane that is perpendicular to the z axis and is located at that z=k. $I_{z=k}(x,y)$ is the associated image, i.e. the attenuation coefficient function on the same plane. $v_{z=k}(x, y)$ represents the dislocation of the edge at (x, y) along the local gradient from z=k to z=k+1. $v_{z=k}(x,y)$ is computed for all k, i.e. for all slices, within the subvolume except at the boundaries. In one example, k could be 25, but k is not limited to 25 and could also be a higher or a lower number. In general, the number for k depends on the maximum polyp size of interest and the data resolution. The positive z direction was defined to be outwards from the center slice. This consistency is required as $v_{z=k}(x,y)$ for all k are summed and (optionally) smoothed to get a composite EDF, $\bar{v}_z(x,y)$, associated with the current subvolume and the scrolling axis Z (see FIG. 1; $\bar{v}_z(x,y)$ can be considered as a 2-D representation of a 3-D subvolume of the xy plane scrolled over the Z axis). Thus it is assured that the edges of polyp-like structures move inwards on the plane perpendicular to the scrolling axis. The composite EDF could also be (optionally) smoothed. An example of a smoothing kernel is a Gaussian (σ=2 mm) whose size could be limited to 2σ. The steps could be completed for all three orthogonal axes (Z=[Axial, Sagittal, Coronal]) resulting in three EDFs that encode information regarding the structure of interest.

Figure 2:
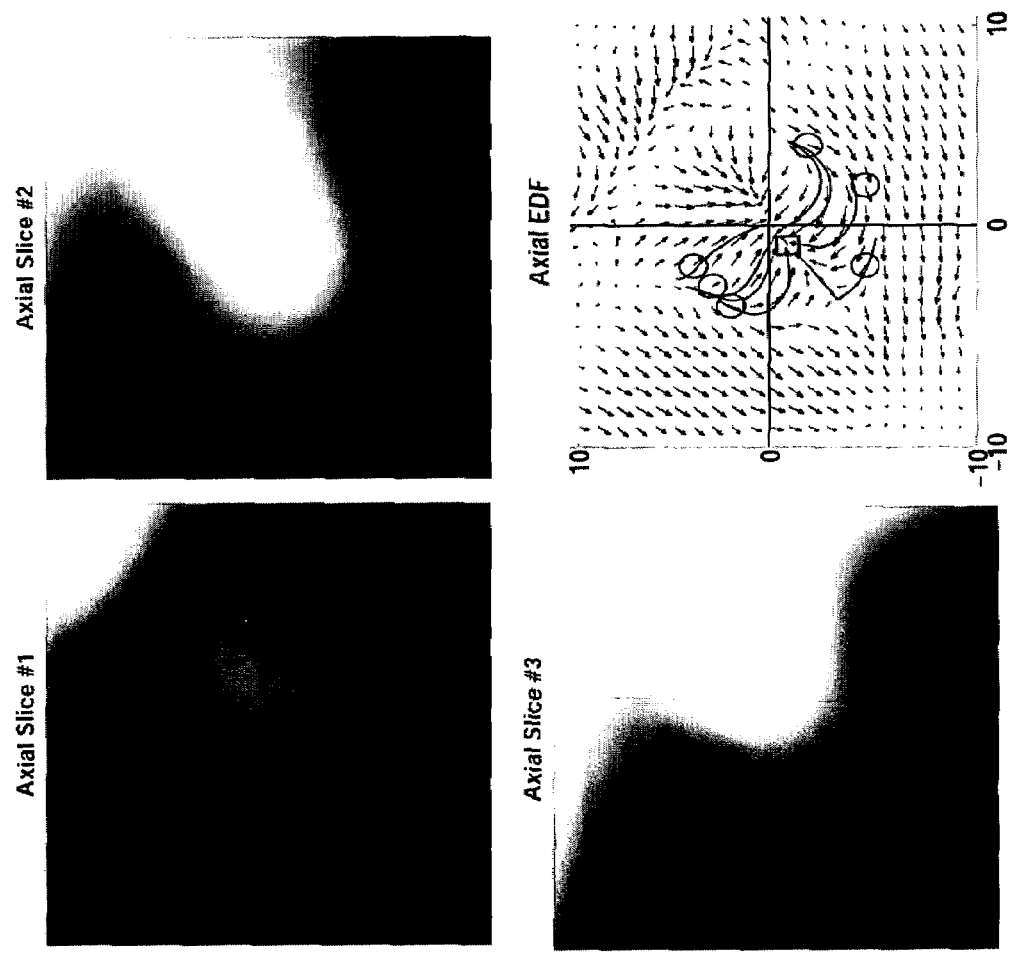
FIG. 2 shows an example of three sequential axial images (smoothed for visual purposes) around a pre-detected structure and the associated EDF $\bar{v}_{axial}(x, y)$.

The next step is to characterize the vector fields for a single image plane or a combination of image planes. The characterization is based on determining some landmarks in the EDFs. For example, to characterize a single EDF, selected from $\bar{v}_{axial}(x,y)$, $\bar{v}_{coronal}(x, y)$, or $\bar{v}_{sagittal}(x,y)$, one parent node (PN) and a plurality, e.g. eight child nodes (CNs) could be determined. A PN is defined to be the minimum divergence pixel location on the EDF (the PN is marked with a square in FIGS. 1-3). In case a pre-detection method is used to detect a structure of interest the PN could be defined to be the minimum divergence pixel location in, for instance, a 4×4 mm neighborhood of the pre-detected point on the EDF. CNs are defined to be the pixel locations that are a distance (e.g. 4 mm) away from the PN on the streamlines incoming to the eight immediate neighbors of the PN (CNs are marked with a circle in FIGS. 1-3). FIG. 2 shows an example with three associated axial images and the associated EDF $\bar{v}_{axial}(x,y)$. The parent node (PN) is marked with a square and the children nodes (CNs) are marked with small circles. It is noted that two of the eight CNs coincide with two other CNs.

Each of the EDFs $\bar{v}_{axial}(x, y)$, $\bar{v}_{coronal}(x, y)$ and $\bar{v}_{sagittal}(x, y)$ could be used to compute parameters to classify the structure of interest. As indicated supra the classification could be done using parameters computed from one image plane or a using the parameters computed from a combination of image planes. In one example two parameters, α and β, are computed using the Jacobian matrix of the EDF at the PN (See e.g. J. Helman et al., "Representation and display of vector field topology in fluid flow data sets," *IEEE Computer*, vol. 22, pp. 27-36, August 1989; or Y. Lavin et al., "Feature comparisons of vector fields using earth mover's distance," in *Proc. Visualization '98*, pp. 103-109, 524). The computation of those parameters is as follows:

$$J = \begin{pmatrix} \frac{\partial v_x}{\partial x} & \frac{\partial v_x}{\partial y} \\ \frac{\partial v_y}{\partial x} & \frac{\partial v_y}{\partial y} \end{pmatrix} \quad (2)$$

$$\alpha = \frac{\partial v_x}{\partial x} + \frac{\partial v_y}{\partial y} \quad (3)$$

$$\beta = \frac{\alpha^2 - 4|J|}{|\alpha^2 - |J||} \sqrt{|\alpha^2 - 4|J||} \quad (4)$$

Note that α and β carry information about the eigenvalues of the Jacobian matrix J. In fact, the characteristic equation of J is:

$$\lambda^2 - \alpha\lambda + |J| = 0 \quad (5)$$

Furthermore, α is equal to the divergence of the EDF at PN. β is also computed at the PN and describes the circulatory behavior of EDF at the PN. The ratio of α to β uniquely defines the topology of a linear vector field at the PN so the normalized α and β (normalized by $\sqrt{\alpha^2+\beta^2}$) are used as suggested by Lavin et al. (Y. Lavin et al., "Feature comparisons of vector fields using earth mover's distance," in *Proc. Visualization '98*, pp. 103-109, 524).

Additionally, one could characterize the behavior of the incoming streamlines around the PN using the parameter d, defined as:

$$d = \frac{1}{8} \sum_i \left( \sqrt{\sum_j \theta_{ij}^2} \right) \theta_{ij} \leq (CN_i; CN_j) \in [0, \pi] \quad (6)$$

where $\theta_{ij}$'s are computed with respect to the PN's. d describes the spread of CNs around the PN. Thus, d is used to characterize the spread of CNs around the PN.

Figure 3:
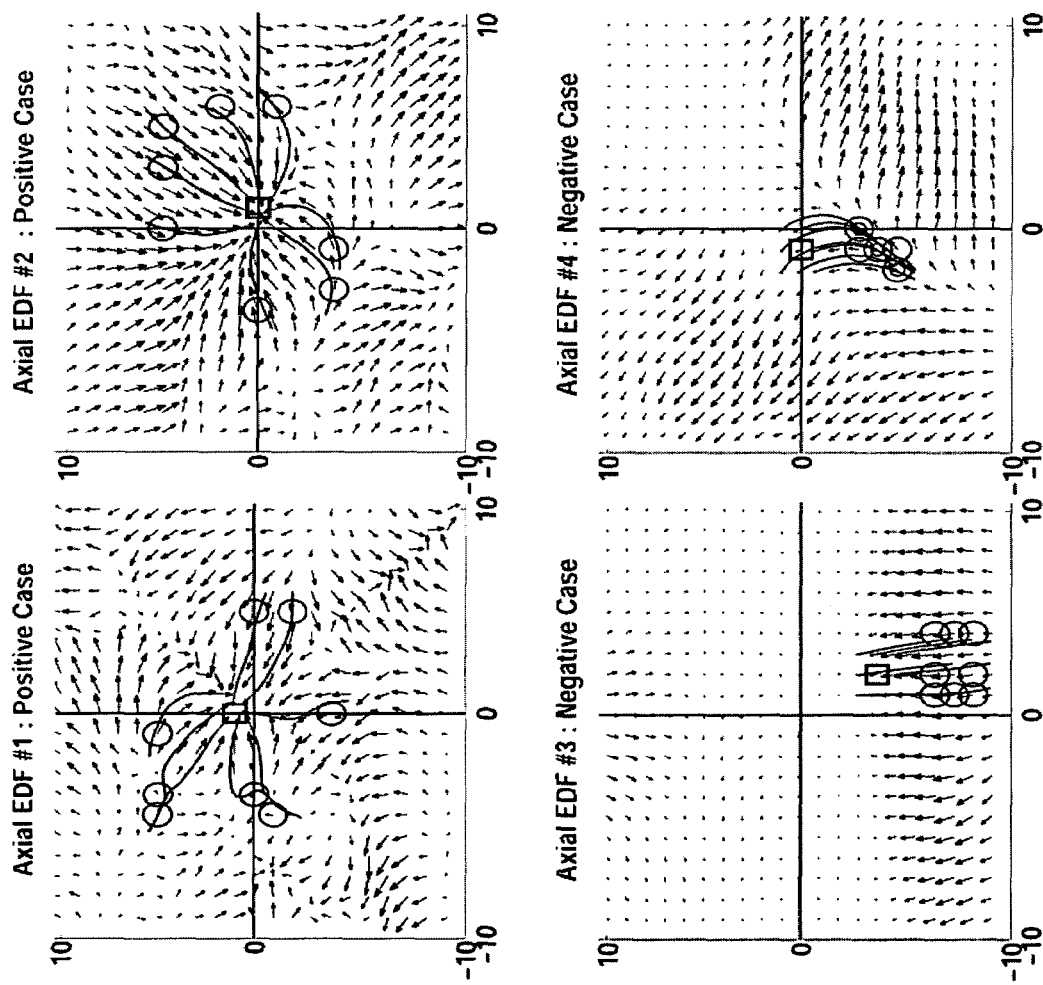
FIG. 3 shows an example of axial EDFs of four cases: (a) positive (polyp) with [α; β; d]=[−0.96; 0.29; 4.99]; (b) positive with [α; β; d]=[−0.99; 0.12; 5.15]; (c) negative (non-polyp) [α; β; d]=[−0.77; 0.65; 1.28]; (d) negative with [α; β; d]=[−0.71; 0.70; 0.72].

FIG. 3 shows an example of four axial EDFs computed for two positive (polyp) and two negative (nonpolyp) cases to provide an understanding of the meaning of EDF characterization parameters visually. In agreement with the intuition, the EDFs corresponding to positive cases have a PN with an α close to 1 (negative divergence) and β close to zero (small circulatory behavior), and a large d (streamlines well spread around the PN), i.e., a star-shaped topology, unlike the EDFs of negative cases.

Referring back to the exemplary embodiment related to three mutually orthogonal image planes, each parameter could be determined for the axial, coronal, and sagittal EDFs, resulting in a nine-dimensional feature vector for each subvolume considered. In one aspect, one could select to use the mean values of each parameter over three scrolling axes as the final feature vector f=[$\bar{\alpha},\bar{\beta},\bar{d}$] where stands for averaging over axial, coronal and sagittal parameters. However, in another aspect one could use other functions and/or criteria of the EDF parameters instead of taking the mean of EDF parameters.

The parameters or the feature vector could now be used to classify the structure of interest. In one example, a binary classification could be established to classify between a polyp versus a non-polyp using a Mahalanobis distance based linear classifier [See PC Mahalanobis, On the generalized distance in statistics, *Proc. Natl. Institute of Science of India* 12:49-55, 1936). The Mahalanobis distance of a vector f to the mean vector $m_\Gamma$ of a population Γ is defined as:

$$r_{f,m_\Gamma} = \sqrt{(f-m_\Gamma)^T C_\Gamma^{-1}(f-m_\Gamma)} \quad (7)$$

where $C_\Gamma$ is the covariance matrix of Γ. This distance is a standardized measure that: 1) automatically accounts for scaling; 2) takes care of correlations between features; and 3) can provide linear and curved decision surfaces. For classification purposes, Γ represents the training set and f represents a sample from the test set Ω. Referring to the subset of polyps in Γ as $\Gamma_1$, and the subset of nonpolyps as $\Gamma_0$, the binary classifier is defined as follows:

$$r_{f,m_{\Gamma_1}} - r_{f,m_{\Gamma_0}} + b \leq 0 \Rightarrow f \in \Omega_1 \text{ otherwise } f \in \Omega_0 \quad (8)$$

where $\Omega_1$ and $\Omega_0$ refer to the subsets of polyps and nonpolyps in Ω. An alternative to the Mahalanobis distance-based classifier is the use of SVMs, which minimize training classification error as well as generalization error. In general, the present invention is however, not limited to the selection of a particular classifier.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For instance the present invention has been described in the context of a method, those skilled in the art will appreciate that the method of the present invention is capable of being distributed in the form of a computer readable medium of instructions in a variety of forms, and that the present invention applies equally regardless of the particular type of signal bearing medium used to actually carry out the distribution. In other words, the present invention is also a program storage device accessible by a computer, tangible embodying a program of instructions or means executable by the computer to perform method steps for detection and classification of a shape in a medical image as described supra. Examples of computer readable media include recordable type media such as disks and CD-ROMS and transmission type media such as digital and analog communication links. In addition, the present invention could be implemented and coded in different programming languages and/or packages. All such variations are considered to be within the scope and spirit of the present invention as defined by the following claims and their legal equivalents.

What is claimed is:

1. A method for detecting and classifying a structure of interest in a three-dimensional medical image, comprising the steps of: (a) defining one or more image planes in a subvolume in said three-dimensional medical image; (b) determining edge displacement fields for a plurality of slices in each of said defined image plane, wherein said plurality of slices are defined over the axis perpendicular to said corresponding image plane; (c) combining said determined edge displacement fields for each of said defined image plane; (d) determining parameters based on said combined edge displacement field; and (e) classifying said structure of interest based on said determined parameters.

2. The method as set forth in claim 1, wherein at least two of said defined image planes are mutually orthogonal image planes.

3. The method as set forth in claim 1, wherein said step of classifying is based on a combination of said parameters determined from two or more of said defined image planes.

4. The method as set forth in claim 1, wherein the step of classifying further comprises the step of distinguishing a polyp from a non-polyp.

5. The method as set forth in claim 1, wherein said subvolume is selected by a pre-detection of said structure of interest.

6. The method as set forth in claim 1, wherein said three-dimensional medical image comprises a three-dimensional segmented computed tomography image.

7. A program storage device having a computer readable medium accessible by a computer, tangible embodying a program of instructions on said computer readable medium and executable by said computer to perform method steps for detecting and classifying a structure of interest in a three-dimensional medical image, comprising: (a) means for defining one or more image planes in a subvolume in said three-dimensional medical image; (b) means for determining edge displacement fields for a plurality of slices in each of said defined image plane, wherein said plurality of slices are defined over the axis perpendicular to said corresponding image plane; (c) means for combining said determined edge displacement fields for each of said defined image plane; (d) means for determining parameters based on said combined edge displacement field; and (e) means for classifying said structure of interest based on said determined parameters.

8. The program storage device as set forth in claim 7, wherein at least two of said defined image planes are mutually orthogonal image planes.

9. The program storage device as set forth in claim 7, wherein said means for classifying is based on a combination of said parameters determined from two or more of said defined image planes.

10. The program storage device as set forth in claim 7, wherein said means for classifying further comprises means for distinguishing a polyp from a non-polyp.

11. The program storage device as set forth in claim 7, wherein said subvolume is selected by a pre-detection of said structure of interest.

12. The program storage device as set forth in claim 7, wherein said three-dimensional medical image comprises a three-dimensional segmented computed tomography image.

* * * * *